United States Patent [19]
Postner

[11] Patent Number: 4,612,197

[45] Date of Patent: Sep. 16, 1986

[54] SAUCE ENHANCER IN TUBES

[75] Inventor: Hermann Postner, Ludwigsburg, Fed. Rep. of Germany

[73] Assignee: Nestec S. A., Vevey, Switzerland

[21] Appl. No.: 745,598

[22] Filed: Jun. 17, 1985

[30] Foreign Application Priority Data

Jun. 27, 1984 [DE] Fed. Rep. of Germany ....... 3423699

[51] Int. Cl.$^4$ .......................... A23L 1/32; A23L 1/39
[52] U.S. Cl. ..................... 426/47; 426/581; 426/586; 426/589; 426/578; 426/575; 426/613; 426/330.1; 426/330.2; 426/334; 426/130
[58] Field of Search ............. 426/589, 573, 575, 578, 426/613, 614, 586, 330.1, 330.2, 47, 130, 334, 602

[56] References Cited

U.S. PATENT DOCUMENTS

| | | | |
|---|---|---|---|
| 951,504 | 3/1910 | Marlett | 426/578 |
| 3,314,798 | 4/1967 | Graves | 426/586 |
| 3,409,443 | 11/1968 | Polya et al. | 426/614 |
| 4,034,124 | 7/1977 | Dam | 426/589 |
| 4,291,066 | 9/1981 | Anema et al. | 426/589 |
| 4,341,808 | 7/1982 | Croyle | 426/614 |
| 4,479,973 | 10/1984 | Holley | 426/578 |

*Primary Examiner*—Jeanette Hunter
*Attorney, Agent, or Firm*—Vogt and O'Donnell

[57] ABSTRACT

A sauce enhancer in tubes which is microbiologically stable, without the addition of preservatives or heat treatment, comprising cream, egg yolk modified with phospholipase A2 and a fat component of a liquid butter fat fraction, alone or in admixture with vegetable oil, wherein the sauce enhancer has a pH value of from 5.6 to 6.8 and a water activity value ($a_w$-value) between 0.84 and 0.9, with which other milk components and flavor intensifiers may be incorporated.

17 Claims, No Drawings

SAUCE ENHANCER IN TUBES

Egg yolk, starches and flours, cream or fresh cream, milk and flavor enhancers are often used, mostly in combination, for thickening soups, sauces, vegetable broths and the like. The flavor enhancers used are generally salt- and glutamate-based seasonings which are primarily intended to intensify the specific flavor of the foods to be improved. So-called "sauce binders" are also known. These are primarily instantly soluble mixtures of modified starches and starch derivatives which are merely intended to increase the viscosity (texture) of the hot soup, sauce and the like.

For enhancing the enjoyment of foods, it is generally desired to add egg, butter and other milk-based constituents, especially cream, and flavor enhancers in order to improve flavor, color and texture. An additional thickening effect may then be obtained by adding thickeners and combinations thereof.

On a domestic scale, only small quantities of these individual constituents are generally required per application. Accordingly, there is an interest in having a universally useable mixture, particularly based on egg yolk, permanently available in stable, readily dispensable form in the home, which may be directly stirred for enrichment into the prepared, hot soup, sauce or a vegetable stock. However, it is important to bear in mind in this connection that egg yolk and especially whole egg tend to flocculate and coagulate when stirred into hot liquids and that egg and milk constituents (cream, milk, fresh cream, etc.) are known to keep for only a limited period, even in a refrigerator, after opening. Although an improvement in the keeping properties may be obtained by adding relatively large quantities of sugar or salt, flavor is overly affected in this way. Special sterilizing treatments are generally out of the question because both the consistency and flavor of the products are affected in this way. Accordingly, the preparations based on egg and milk products generally contain additions of preservatives to prevent microbiological decomposition. However, additions such as these are undesirable for various reasons. An egg-milk-sugar mixture which is pasteurized and chemically preserved is described in U.S. Pat. No. 2,920,966, whilst U.S. Pat. No. 2,848,334 describes a product for cool storage which, although keeping for only a limited period, also has to be pasteurized.

The object of the present invention is to provide, as a sauce enhancer, a preparation which is stable, conveniently dispensable from a tube and readily suspendable in liquid and which will keep for 6 to 8 months at room temperature without the addition of preservatives and without any additional heat treatment. The ready-to-use preparation is intended to be expressable from the tube even when cold, i.e., after removal of the tube from the refrigerator, and to be able to be stirred directly into the hot soup, sauce and the like in order to bring about the desired improvement in consistency, flavor and appearance.

It has now surprisingly been found that a preparation based on cream, egg yolk or derivatives thereof, a liquid butter fat fraction, milk derivatives and flavor intensifiers or enhancers is capable of achieving the object as stated above providing it has a pH-value of from 5.6 to 5.8, providing the water activity value ($a_w$-value) as measured at 25° C. is adjusted to 0.84–0.9 and providing it contains an egg yolk modified by phospholipase A2. A thickening effect may be obtained by adding starch or starch derivatives.

So far as dispensability and ensuring bacteriological stability are concerned, the tube pack is optimal for preparations of the type in question. It has been found that, even in the case of microbiologically stable products based on egg or milk (for example sweetened condensed milk), mold or yeast growth cannot be ruled out after opening despite cool storage, particularly as a result of condensation in the product-free head space of other types of pack, for example screw-top bottles. Accordingly, the preparation according to the invention is intended to be packed and presented in tubes, ensuring its stability even after the pack has been opened.

The egg component used is a commercial, salted and pasteurized egg yolk. In order to avoid the above-mentioned tendency towards coagulation on stirring into hot foods, the phospholipides of the egg yolk are correspondingly modified by enzymatic hydrolysis. Through elimination of fatty acid residues, water-soluble lysophosphatides are formed. The egg yolk may be enzymatically pretreated or the phospholipase A2 is added in a quantity of from about 1000 to 1500 I.U./kg egg yolk at the beginning of the mixing process. One suitable preparation is inter alia the commercial product "Lecitase" made by Novo-Industri of Bagsvaerd, Denmark. Through the addition of an enzyme, the phospholipides of the egg yolk in particular and those of the milk components are converted into the corresponding lysophosphatides in situ, i.e., in the mixture of the components. The reaction is over after about 2 weeks at room temperature and ensures the stability of the preparation against coagulation when stirred into the hot foods.

Suitable milk components are primarily UHT-stabilized sweet cream, sour cream or fresh cream having the standing commercial fat content (>30%). Skimmed milk powder or any other dried milk derivative may be added to increase the milk solids.

A liquid butter fat fraction is used as the fat component either on its own or in admixture with low-melting vegetable fats, for example palm oil or other vegetable oils. The use of standard commercial butter or solid butter fat fractions is unsuitable for the preparation according to the invention because they cause crystallization in the prepared mixture, thus preventing or complicating expression or dispensability from refrigerated tubes. Accordingly, a low-melting (<13° C.) butter fat fraction is used instead of standard commercial butter. To round off the flavor and to reduce wate activity, sodium glutamate may be added instead of sodium chloride or part of the sodium chloride in the preparation according to the invention. The addition of sodium glutamate not only improves flavor, it also has the advantage that the water activity necessary for stability may be effectively adjusted in that way.

The components may be mixed with or without thickener, depending on whether only a thickening and flavor-enhancing effect or also an additional thickening effect is to be obtained. Suitable thickeners are starch derivatives having a low gelatinization temperature, particularly slightly crosslinked potato starches. Native starches are less suitable on account of their tendency to form a skin after preparation of the sauces, etc. However, the size of the starch content is limited on formulation grounds (adequate egg, milk, fat content).

Accordingly, an additional thickening effect may be obtained by relatively small amounts of K-carragheenate (for example Genulacta P100, KOBENHAVNS PEKTINFABRIK, Denmark). Kappa-carragheenate forms a gel structure with the milk protein fraction on heating, producing an additional increase in viscosity. The aqueous starting components, such as cream and salted egg yolk, should be sterilized or prepasteurized and hence free from pathogenic germs and sources of decay (molds, yeasts and lactobacilli).

To ensure the bacteriological stability of the end product without further heat treatment or the addition of bacteriostatic agents, the water activity ($a_W$-value) has to be adjusted to a value of <0.9 and preferably to a value of from 0.86 to 0.88. The $a_W$-value (=equilibrium moisture over the product in % atmospheric moisture) is another factor crucial to the stability of the preparation. With values below <0.84, there is a danger of dehydration reactions occurring during storage with a change in color, i.e., browning of the preparation even in the absence of air in the tube because, with $a_W$-value of <0.84, the tendency towards Maillard reactions (formation of brown pigments from reaction products of amino acids and reducing sugars) increases, particularly at high storage temperatures. Both reactants, especially glutamic acid and lactose, are present in high concentrations in the product according to the invention. An additional delay in the formation of unwanted brown reaction products is also obtained by lowering the original pH-value of around 6.20 to values below 5.80. Relatively small, sensorially compatible additions of lactic or citric acid are sufficient for that purpose. After all the components have been mixed, the pH-value should preferably amount to 5.7. The preparation shows adequate microbiological stability even at storage temperatures of >30° C. In general, a reduction of any germ counts originally present by 1-2 powers of ten could be observed even in the sauce enhancer according to the invention after incubation for 4 weeks. Minor changes in taste during storage at 20° C. are observed at the earliest after 6 to 8 months, although there are no decay reactions, such as "curdling", oxidation of fats and the like. If the sauce enhancer is stored in a refrigerator, no changes are apparent even after more than one year. In practice, from 20 to 25 g of the sauce enhancer, i.e., about 1 tablespoonful or more or less, as required, are vigorously stirred with an egg whisk into approx. 0.5 l of prepared, cooked soup, sauce or vegetable stock after removal from heat, after which the food is ready for consumption. In the case of the starch-containing component, a single boiling is advantageous to reach the maximal end viscosity.

To prepare the sauce enhancer, the liquid components, namely cream and egg yolk, are premixed cold at 10–20° C., for example in a STEPHAN machine, after which the necessary quantity of lecitase in approx. 100 times the quantity of water is mixed in. It is also possible to mix the lecitase into the egg yolk beforehand and then to store the egg yolk in a refrigerator for about 1 week at around +5° C. The enzyme reaction takes place quantitatively in that time. This pretreatment also ensures the prevention of coagulation on heating.

The mixer is then evacuated by means of a vacuum pump and the fat component (liquid butter oil, possibly with vegetable oil added) is introduced under suction into the mixer rotating at high speed. The premixed dry ingredients, such as milk powder, glutamate, flavorings and optionally thickeners, are then introduced and thoroughly mixed in vacuo. The final temperature should be about 25°–30° C. The end product has a smooth, soft, margarine-like consistency and may readily be packed in tubes by means of metering pistons. Inclusions of air in the tube should be avoided as far as possible during packing. There is no need for special sterilizing measures.

EXAMPLE 1

Recipe for enriching and thickening sauces

| | % by weight |
|---|---|
| Egg yolk (10% salt, water content: 54%) | 36.00 |
| Cream (>38% fat) | 24.24 |
| Enzyme solution (350 mg "lecitase" in 10.0 ml) | 0.01 |
| Glutamate | 7.00 |
| Salt | 1.50 |
| Skimmed milk powder (water content 4.3%) | 17.00 |
| Butter fat, fractionated (melting point <12° C.) + vegetable oil) | 14.00 |
| Flavorings | 0.05 |
| Lactic acid (90%) | 0.20 |
| | 100.00 |

The mixture obtained has a water activity of 0.86 and a pH-value of 5.70.

This mixture should be used in an approximate dose of 20 g to 0.5 l of sauce.

EXAMPLE 2

Recipe with a thickening effect

| | % by weight |
|---|---|
| Egg yolk (10% salt; water content: 54%; pretreated with enzyme) | 13.00 |
| Cream (>38% fat) | 20.00 |
| Genulacta P 100 (kappa-carragheenate) | 1.00 |
| Glutamate | 5.00 |
| Salt | 2.30 |
| Butter fat, fractionated (melting point <12° C.) | 10.50 |
| Vegetable oil | 10.00 |
| Modified potato starch | 38.00 |
| Flavoring | 0.05 |
| Lactic acid (90%) | 0.15 |
| | 100.00 |

Recommended approximate dose: 20–30 g to 0.5 l of liquid.

I claim:

1. A sauce enhancer comprising cream, egg yolk modified by phospholipase A2, and a liquid butter fat fraction having a melting point less than 13° C. wherein the sauce enhancer has a pH-value of from 5.6 to 5.8 and a water activity value ($a_w$-value) as measured at 25° C. of from 0.84–0.9.

2. A sauce enhancer as claimed in claim 1, wherein the $a_w$-value is from 0.86–0.88.

3. A sauce enhancer as claimed in claim 1, further comprising a thickening additive selected from the group consisting of modified potato starch and K-carragheenate.

4. A sauce enhancer as claimed in claim 2, wherein the pH-value is 5.7.

5. A sauce enhancer comprising cream and egg yolk, each modified by phospholipase A2, and a liquid butter fat fraction having a melting point less than 13° C. wherein the sauce enhancer has a pH-value of from 5.6 to 5.8 and a water activity value ($a_w$-value) as measured at 25° C. of from 0.84–0.9.

6. A sauce enhancer as claimed in claim 1 or 5, further comprising a vegetable oil.

7. A sauce enhancer as claimed in claim 5, wherein the vegetable oil is palm oil.

8. A sauce enhancer as claimed in claim 1 or 5, further comprising other milk components and flavor intensifiers.

9. A sauce enhancer as claimed in claim 1 or 5, further comprising sodium glutamate.

10. A process for the preparation of a sauce enhancer comprising:
  (a) treating egg yolk with phospholipase A2 to convert phospholipids of the egg yolk to lysophatides;
  (b) adding and mixing cream with the treated egg yolk;
  (c) adding and mixing a butter fat fraction having a melting point less than 13° C. with the treated egg yolk and cream mixture; and
  (d) adjusting the pH to from 5.6 to 5.8 and adjusting the water activity value ($a_w$-value) as measured at 25° C. to from 0.84–0.9.

11. A process for the preparation of a sauce enhancer comprising:
  (a) mixing cream and egg yolk;
  (b) adding and mixing phospholipase A2 with the cream and egg yolk mixture;
  (c) adding and mixing a butter fat fraction having a melting point less than 13° C. with the mixture; and
  (d) adjusting the pH to from 5.6 to 5.8 and adjusting the water activity value ($a_w$-value) as measured at 25° C. to from 0.84–0.9.

12. A process as claimed in claim 10 or 11, further comprising adding and mixing a vegetable oil to the mixture with the butter fat fraction.

13. A process as claimed in claim 12, wherein the vegetable oil is palm oil.

14. A process as claimed in claim 10 or 11, further comprising adding and mixing sodium glutamate to the mixture after adding and mixing the butter fat fraction.

15. A process as claimed in claim 10 or 11, further comprising adding a thickening agent selected from the group consisting of modified potato starch and K-carragheenate after adding and mixing the butter fat fraction.

16. A process as claimed in claim 10 or 11 further comprising adding and mixing other milk components and flavor intensifiers to the mixture after adding and mixing the butter fat fraction.

17. A process as claimed in claim 10 or 11 further comprising packaging the sauce enhancer composition in tubes.

* * * * *

UNITED STATES PATENT AND TRADEMARK OFFICE
CERTIFICATE OF CORRECTION

PATENT NO. : 4,612,197

DATED : September 16, 1986

INVENTOR(S) : Hermann Postner

It is certified that error appears in the above-identified patent and that said Letters Patent is hereby corrected as shown below:

On the title page, under the heading "References Cited", the spelling of the inventor for U.S. Patent No. 4,034,124 should read -- van Dam --.

Column 2, line 52 "wate" should read -- water --.

Column 4, line 57, (claim 2) "as claimed in claim 1" should read -- as claimed in claim 1 or 5 --.

Column 4, line 59, (claim 3) "as claimed in claim 1" should read -- as claimed in claim 1 or 5 --.

Signed and Sealed this

Second Day of December, 1986

*Attest:*

DONALD J. QUIGG

*Attesting Officer*  *Commissioner of Patents and Trademarks*